(12) United States Patent
Mezzabotta

(10) Patent No.: US 11,815,144 B2
(45) Date of Patent: Nov. 14, 2023

(54) RETRACTION SPRING FOR RETRACTING A BRAKE PAD

(71) Applicant: HL MANDO CORPORATION, Gyeonggi-do (KR)

(72) Inventor: Andrea Mezzabotta, Frankfurt (DE)

(73) Assignee: HL MANDO CORPORATION, Gyeonggi-Do (KR)

( * ) Notice: Subject to any disclaimer, the term of this patent is extended or adjusted under 35 U.S.C. 154(b) by 98 days.

(21) Appl. No.: 17/203,744

(22) Filed: Mar. 16, 2021

(65) Prior Publication Data

US 2021/0324928 A1 Oct. 21, 2021

(30) Foreign Application Priority Data

Apr. 17, 2020 (DE) .......................... 102020204930.0

(51) Int. Cl.
    *F16D 65/54* (2006.01)
    *F16D 65/097* (2006.01)
    *F16D 127/02* (2012.01)

(52) U.S. Cl.
    CPC ....... *F16D 65/543* (2013.01); *F16D 65/0977* (2013.01); *F16D 2127/02* (2013.01)

(58) Field of Classification Search
    CPC .... F16D 65/54; F16D 65/543; F16D 2127/02; F16D 65/52; F16D 55/228; F16D 2055/0041; F16D 2055/0029; F16D 65/0979; F16D 65/0978; F16D 65/0977
    See application file for complete search history.

(56) References Cited

U.S. PATENT DOCUMENTS

| | | | |
|---|---|---|---|
| 5,699,882 A | 12/1997 | Ikegami et al. | |
| 6,003,642 A | 12/1999 | Mori et al. | |
| 7,318,503 B2 | 1/2008 | Farooq | |
| 9,670,977 B2* | 6/2017 | Boyle | F16D 65/0972 |
| 9,677,629 B2* | 6/2017 | Boyle | F16D 65/0978 |
| 9,689,445 B2* | 6/2017 | Merrien | F16D 55/2265 |
| 10,036,438 B2* | 7/2018 | Gasslbauer | F16D 55/225 |

(Continued)

FOREIGN PATENT DOCUMENTS

| | | | |
|---|---|---|---|
| EP | 2213900 A1 * | 8/2010 | |
| EP | 2910810 A1 * | 8/2015 | |

(Continued)

*Primary Examiner* — Robert A. Siconolfi
*Assistant Examiner* — Mahbubur Rashid
(74) *Attorney, Agent, or Firm* — Ladas & Parry, LLP

(57) ABSTRACT

The invention relates to a pad clip (5), comprising at least one retainer (6) for supporting a brake pad (2), and at least one retraction spring (10) for retracting the brake pad (2) in an axial direction upon a brake release, the retraction spring (10) having a spring body (17) with a first portion (11), a second portion (12), and an intermediate portion (13) connecting the first and second portions (11, 12), the first portion (11) comprising a contact portion (14) for contacting the brake pad (2), the second portion (12) being configured to be attached to a calliper support bracket (3), wherein the material of the first portion (11) axially extending between the contact portion (14) and the intermediate portion (13) is configured to be stretched in the axial direction upon a brake action and to return to its unstretched state upon a brake release. The invention also relates to a calliper support bracket (3) and a brake assembly (1).

19 Claims, 7 Drawing Sheets

(56) References Cited

U.S. PATENT DOCUMENTS

| | | | |
|---|---|---|---|
| 2009/0166135 A1* | 7/2009 | Sano | F16D 65/0978 |
| | | | 188/71.8 |
| 2014/0305753 A1* | 10/2014 | Macy | F16D 65/0977 |
| | | | 188/216 |
| 2016/0053837 A1 | 2/2016 | Lou et al. | |
| 2016/0076611 A1* | 3/2016 | Boyle | F16D 65/0972 |
| | | | 188/72.3 |
| 2018/0163800 A1* | 6/2018 | Barbosa | F16D 55/2265 |

FOREIGN PATENT DOCUMENTS

| | | | |
|---|---|---|---|
| FR | 2921136 A1 * | 3/2009 | |
| JP | 2009008113 A * | 1/2009 | |
| WO | WO-2018077728 A1 * | 5/2018 | |

\* cited by examiner

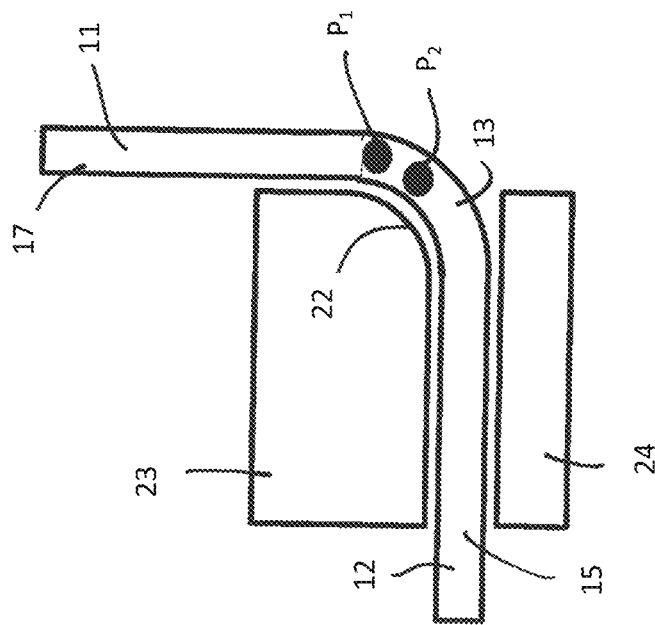
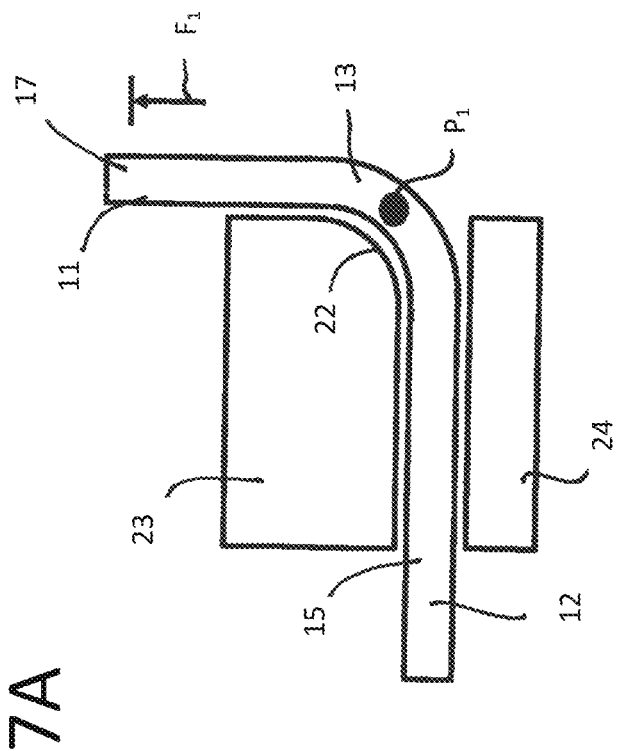
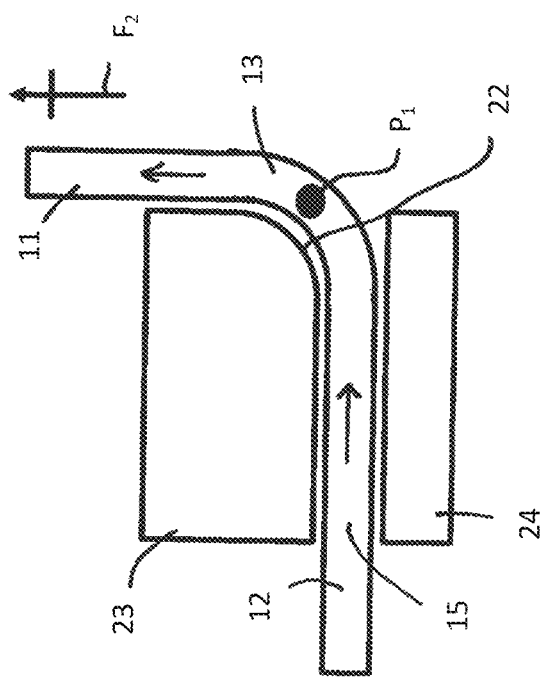

RETRACTION SPRING FOR RETRACTING A BRAKE PAD

CROSS-REFERENCE TO RELATED APPLICATIONS

This application claims the priority to German Patent Application No. 102020204930.0 filed on Apr. 17, 2020, the entire contents of which is incorporated herein by reference.

The present invention is related to a retraction spring that assists in retracting the brake pad after a brake release. More specifically, the material of at least a part of the retraction spring is stretched upon a brake action and returns to its unstretched state upon a brake release. The invention also relates to a brake assembly comprising said retraction spring.

Generally, a brake system, such as a disc brake system, includes a brake disc (sometimes called rotor), a calliper body, a calliper support bracket, and two or more brake pads, such as an inboard brake pad and outboard brake pad on opposing sides of the brake disc. The two or more brake pads are mounted and located adjacent to the calliper support bracket so that the brake pads can move axially, along a rotor axis, a piston bore axis, or both, toward and away from the rotor. The brake assembly may include a pad clip that is mounted between the calliper support bracket and the brake pads so that the brake pads are retained within the brake assembly and move along the pad clip. The disc brake system may also include one or more springs to assist in retracting the brake pads away from a rotor when the brakes are released, and the one or more springs may be a part of the pad clip. Examples of pad clips and pad retraction springs are disclosed in U.S. Pat. Nos. 7,318,503; 6,003,642; and 5,699,882; and US 2016/0053837 A1.

In non-braking conditions, the brake system may experience forces that move one or more components of the brake system into contact with each other, creating a rattling noise that may be audible to an occupant of the vehicle in which the brake system is installed. There is a constant need to provide new and improved pad clips to reduce the sliding resistance of the brake pads along the calliper support bracket; to prevent elements within the brake system from directly contacting other elements within the brake system (e.g., preventing a brake pad from directly contacting the calliper support bracket); to reduce noise, vibration, and harshness; or a combination thereof.

There is also an ongoing need to reduce a residual brake drag in non-braking conditions, i.e. unwanted rubbing contact between the brake pad and the rotating brake disc should be avoided in non-braking conditions. Generally, a non-braking condition may refer to a condition when the brake is not applied.

It would be beneficial to provide a brake system or at least parts thereof having reduced residual drag in non-braking conditions.

The present invention has been made to provide at least one solution to the needs above.

In accordance with claim 1, a retraction spring is provided for retracting a brake pad in an axial direction upon a brake release.

The retraction spring includes a spring body having a first portion, a second portion, and an intermediate portion connecting the first and second portions. The first portion comprises a contact portion for contacting the brake pad. The second portion is configured to be connected to a calliper support bracket. The material of the first portion axially extending between the contact portion and the intermediate portion is configured to be stretched in the axial direction upon a brake action and to return to its unstretched state upon a brake release.

Typically, the material of the first portion can be reversibly stretched. In other words, when the braking action is finished and the brake is released, the material of the first portion elastically turns back to its original shape and/or length in the non-loaded condition of the retraction spring. As the material of the retraction spring itself is stretched during a braking action, the retraction spring can have a stiffness that is material and/or geometry dependent and can be adjusted to practical needs. The material of the retraction spring may typically include metals, like steel, or composite materials.

The accompanying change in length of the spring can be therefore small. The relatively small change in length combined with a high spring stiffness and a localized deformation may result in a relatively controlled clearance and independence from other calliper characteristics, like housing displacement forces. Moreover, the retraction spring is configured to be secured to the calliper support bracket. The contact portion may be configured to connect or attach the retraction spring to the brake pad. It may be envisaged that a straight line segment extending axially from the contact portion to the intermediate portion lies completely within the material of the first portion, for example at least in a non-loaded condition of the retraction spring. Stated otherwise, a portion of the spring extending axially from the contact portion to the intermediate portion may have a convex or non-concave shape or a planar shape.

The first portion may have a planar shape. In particular, the part extending between the contact portion and the intermediate portion may have a planar shape, e.g. plate-shaped. The first portion may generally extend in the axial direction. Furthermore, the second portion may have a planar shape. The second portion may extend generally in a lateral direction. The intermediate portion may have a curved shape. In some instances, the first and second portions are arranged at an angle to each other. For instance, the angle between the first and second portions can be between 70° and 110°, optionally between 80° and 100°, preferably 90°.

A brake pad usually includes a backing plate and friction material bound thereto facing the brake disc. Typically, the friction material of the brake pad is subject to wear which results in a decreased axial thickness of the friction material. The retraction spring, however, should provide a relatively constant retraction force independently from brake pad wear. According to some embodiments, the retraction spring is non-reversibly deformed as the brake pad wears (i.e. plastically deformed). In particular, the length of the second portion may be decreased and/or the length of the first portion may be increased.

Preferably, the second portion may engage with an engagement feature on the calliper support bracket. The engagement feature and the second portion can be configured such that the second portion is firmly held by the engagement feature when a force pulling the first portion is lower than a predetermined value. The engagement feature and the second portion can be configured such that the second portion moves with respect to the engagement feature if a force pulling the first portion exceeds a predetermined value. According to some embodiments, the second portion is configured to be movable, e.g. slidably, attached to the calliper support bracket. In particular, the second portion may be configured to slide relative to the calliper support bracket when a force pulling the first portion exceeds a predetermined value. Due to the pulling forces at the first portion the second portion slides relatively to the calliper support bracket resulting in a shortening of the second portion and a corresponding elongation of the first portion. In this way, brake pad wear can be compensated (see also below).

The retraction spring may be configured such that, when a force pulling the first portion during the brake action exceeds a predetermined value or limit, an axial length of the first portion is increased and/or a length of the second portion is decreased. In other words, the length change occurs during a braking action, wherein said lengths remain irreversibly changed in the non-loaded condition of the retraction spring, i.e. when the brake is released. Typically, the increase in length of the first portion and/or the decrease in length of the second portion are irreversible. The net increase in length of the first portion can be substantially equal to the net decrease in length of the second portion. Typically, the increase in length of the first portion compensates the wear of the brake pad. In this way, the retraction force provided by the retraction spring can be held substantially constant independently of the brake pad wear. The increase in length of the first portion can correspond to the decrease in thickness of the brake pad. The non-reversible increase in length of the first portion should not be confused with the elastic axial stretching of the first portion, which is reversible.

Optionally, the second portion includes a slot for engaging with the engagement feature. In this case, the slot may slide relative to the engagement feature. For instance, the second portion may include two legs. The legs may define said slot. Said legs may run substantially parallel to each other.

The retraction spring may be configured such that the first portion is reversibly stretched at most 0.5 mm, preferably at most 0.3 mm, more preferably at most 0.2 mm and/or optionally at most 0.15 mm, in particular when a maximal braking force is applied. In an exemplary embodiment, the first portion is reversibly stretched 0.1 mm, in particular when the maximal brake force is applied. A spring stiffness of the retraction spring may be at least 250 N/mm, preferably at least 400 N/mm, more preferably at least 500 N/mm.

Furthermore, a pad clip including at least one retainer for supporting the brake pad may be envisaged. The retainer may support the brake pad e.g. in a lateral direction, which can be perpendicular to the axial direction. The pad clip may further comprise two of the retainers each for supporting the brake pad. The pad clip can include a connecting portion connecting both retainers and extending substantially in the axial direction. To the pad clip can be assigned two of the retraction springs in accordance with the above description, each for retracting one of the brake pads in an axial direction upon a brake release. The number of retraction springs and the number of retainers can be the same. The retainers can be arranged on different sides of the brake pad.

The retraction spring and/or the retainer and/or the connection portion can each be formed of a single piece. The retraction spring can be movably arranged relative to the pad clip and/or retainer. Optionally, the retraction spring can be slidably attached to the pad clip and/or the retainer. The retraction spring function can be integrated with the other functions of the pad clip. For instance, the retraction spring can be separate, slidably attached or made of only one piece with the pad clip and/or retainer.

The invention also provides a brake assembly comprising the retraction spring in accordance with the above and a calliper support bracket for supporting a calliper of a disc brake. The calliper support bracket includes an engagement feature for securing a portion of a retraction spring of the pad clip.

The engagement feature can comprise a protrusion, which can be an axial protrusion. Further, the engagement feature can comprise a fixation element which can be secured to the protrusion. In some implementations, the second portion can be fixed between the protrusion and the fixation element. The calliper support bracket may also comprise an abutment surface for abutting the retainer of the pad clip as described above. The brake assembly may also include the pad clip as described above. The engagement feature of the calliper support bracket typically engages with the second portion of the retraction spring. Further, the engagement feature of the calliper support bracket may include an edge around which the intermediate portion of the pad clip is arranged.

When the force applied to the first portion exceeds a predetermined value, the second portion slides on the engagement feature, e.g. in a lateral direction, and is partially bent around the edge of the engagement feature such that an axial length of the first portion increases.

A skilled person appreciates that features and/or functionalities described only with regard to the retraction spring can be combined with features of the calliper support bracket and/or the brake assembly and vice versa as long as they do not contradict each other.

Various objects and advantages of the present invention will become apparent to those skilled in the art from the following detailed description of embodiments, when read in light of the accompanying drawings.

FIG. 1 schematically illustrates a perspective view of a brake assembly.

Figure 1:
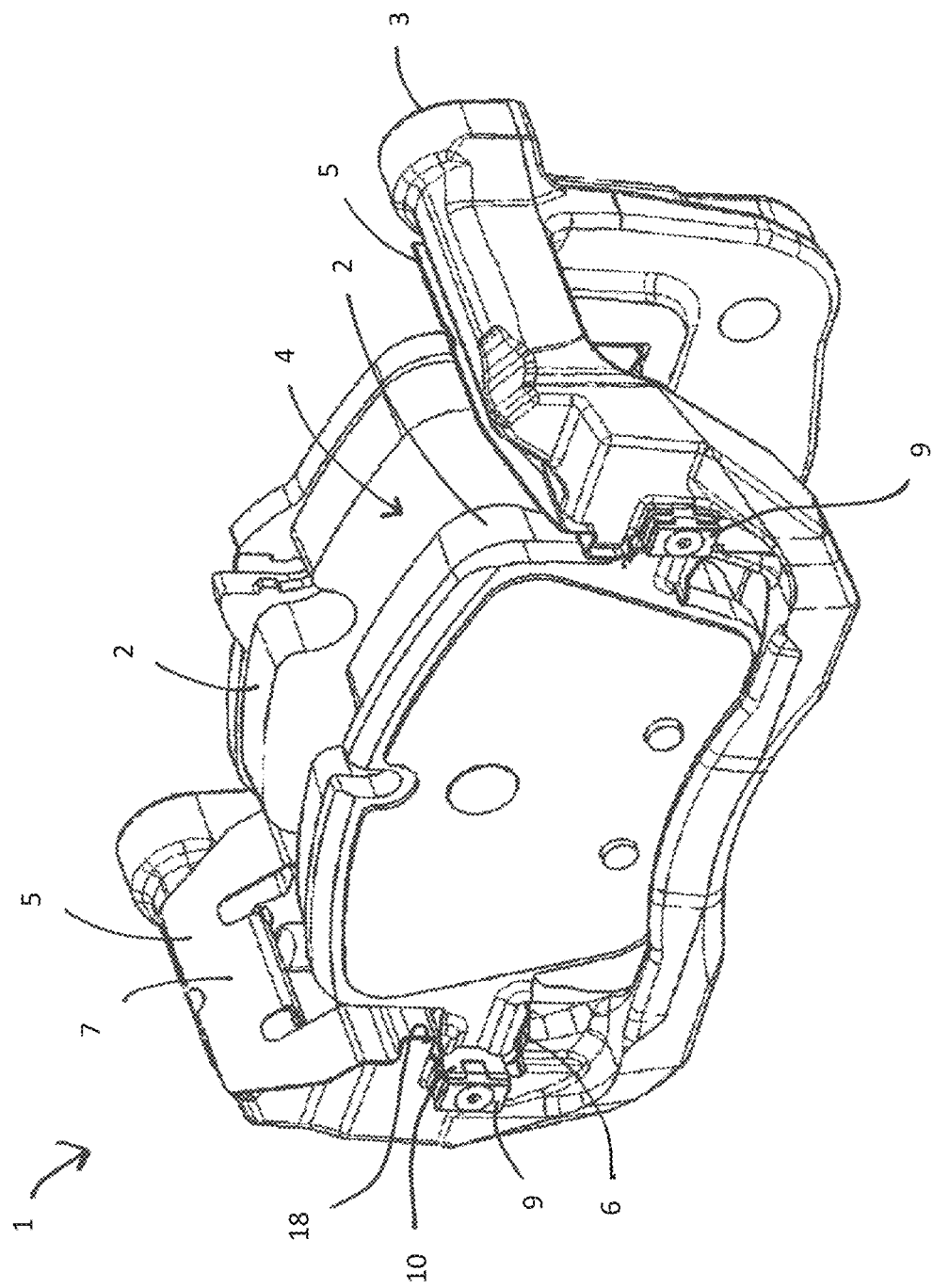

FIGS. 7A-7C schematically show different states of a part of a retraction spring.

In the following, recurring and similar features in this and in the subsequent representations are provided with the same reference numerals.

Figure 2:
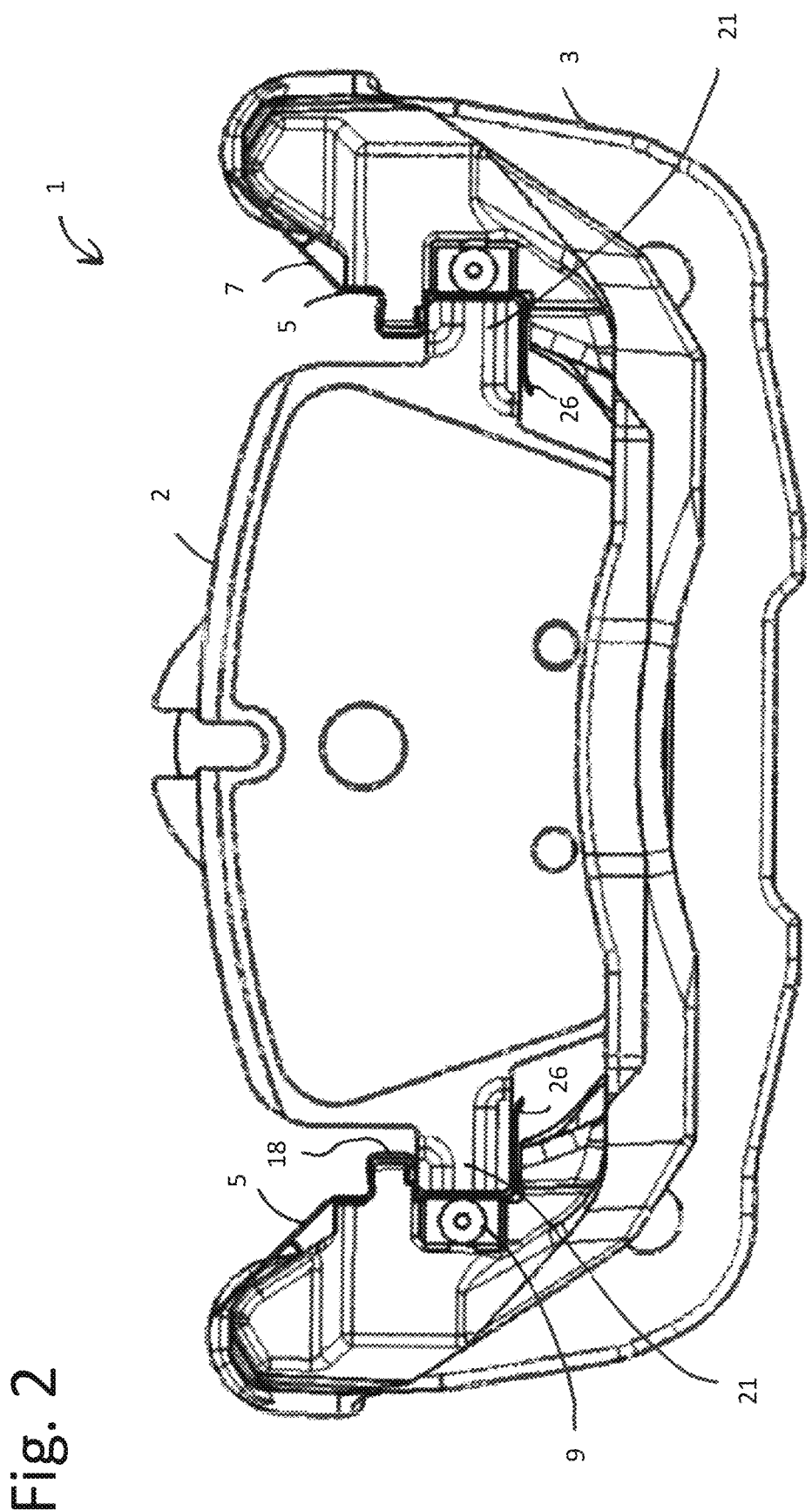
FIG. 2 shows a side view of the brake assembly of FIG. 1.

FIG. 1 and FIG. 2 show a perspective view and a side view, respectively, of a part of a brake assembly 1 which can be used to create a braking force, e.g. for braking a vehicle. Generally, the brake assembly 1 includes a calliper (not shown), two brake pads 2, a brake disc (not shown) and a calliper support bracket 3 for supporting the calliper. The calliper is sometimes called housing. The calliper support bracket 3 supports the two brake pads 2 with a gap 4 therebetween to accommodate the brake disc. The calliper may function to support the brake pads 2 within a brake system, house one or more pistons, axially move the brake pads 2, assist in creating a braking action, or a combination thereof. Each brake pad 2 includes a backing plate and friction material bound to the backing plate. Typically, the friction material faces the brake disc.

Figure 3:
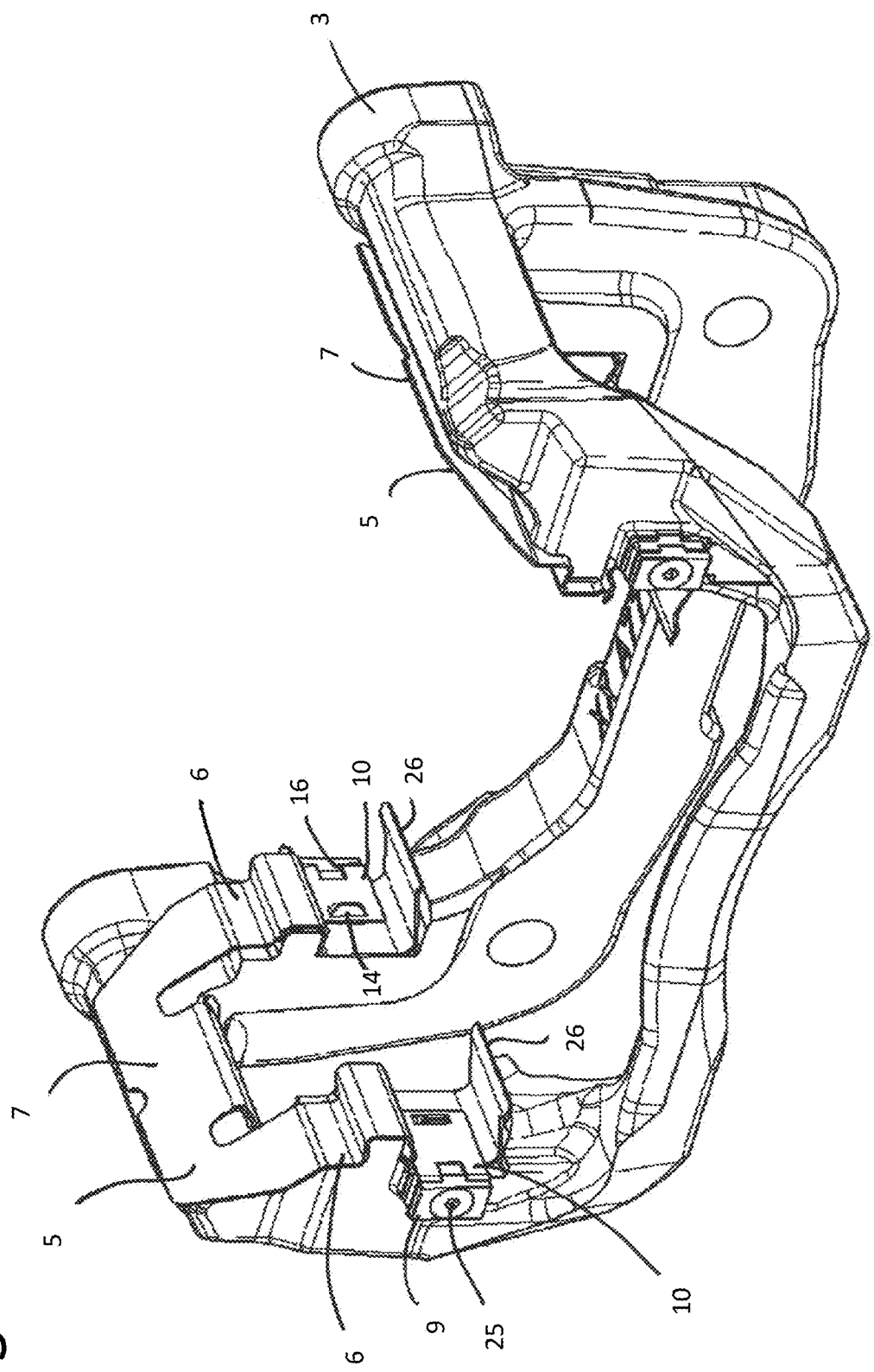
FIG. 3 shows a perspective view of a calliper support bracket on which a pad clip for a supporting a brake pad and a retraction spring for retracting the brake pad are installed.
Figure 4:
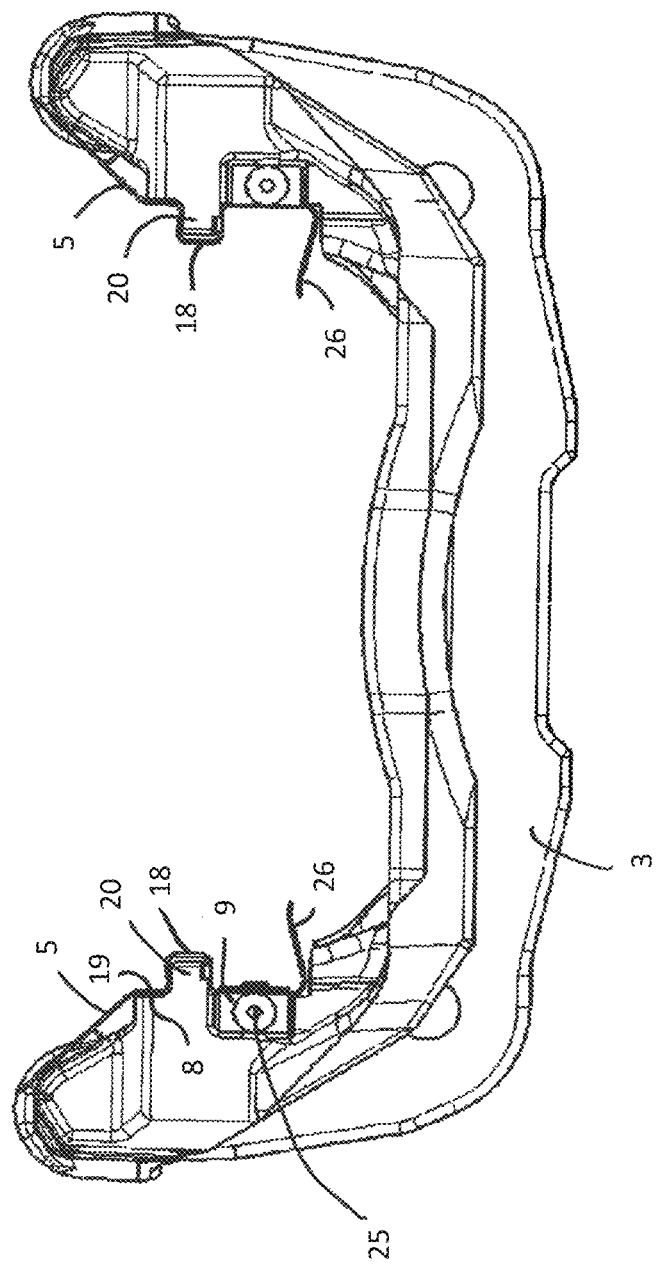
FIG. 4 illustrates a side view of the calliper support bracket and the pad clip of FIG. 3.

FIGS. 3 and 4 show the brake assembly 1 of FIGS. 1 and 2 having the brake pads 2 removed. As can be seen in FIGS. 1-4, an optional pad clip 5 located on each side of the calliper support bracket 3 assists in holding the brake pads 2 in the calliper support bracket 3. The pad clip 5 comprises two retainers 6 each for supporting a brake pad 2. The retainers 6 are connected to each other by a connecting portion 7. As shown, two pad clips 5 can be envisaged to laterally support the two brake pads 2. In some embodiments, the pad clips are omitted.

Furthermore, the pad clip 5 is positioned on the calliper support bracket 3. The pad clip 5 may include a projection segment 18 generally matching the shape of a projection 20 of the calliper support bracket 3. Moreover, the pad clip 5 may include one or more abutment segments 19 generally matching the shape of one or more abutment surfaces 8 of the calliper support bracket 3.

According to the invention, at least one retraction spring 10 is provided for retracting the brake pad 2 after a brake release. In the embodiment shown, the brake assembly 1 includes four retraction springs 10 each engaging with one of the brake pads 2. In other words, each brake pad 2 is assigned two retraction springs 10. Each retraction spring 10 is configured to retract the brake pad 2 in an axial direction upon a brake release. Thus, the retraction spring 10 assists in retracting the brake pad 2 after a braking action has been performed. The retraction spring 10 may store energy during a braking action, and release the stored energy when the brake is released. The retraction spring 10 may exert an axial force, in relationship to the disc brake, in the retraction direction to retract the brake pads 2 axially after the braking action has been performed.

In the depicted embodiment, the retraction springs 10 and the retainer 6 are separate pieces. In some embodiments, the retainer 6 is fixed (i.e. not movable) while the retraction spring 10 is movably, e.g. slidably, disposed relative to the retainer 6. In further embodiments, the retraction spring 10 may be slidably connected to the retainer 6.

In alternative embodiments, the retainer 6 and the retraction spring 10 form one piece, and can be moveable, for example, relative to the calliper support bracket 3.

Figure 5:
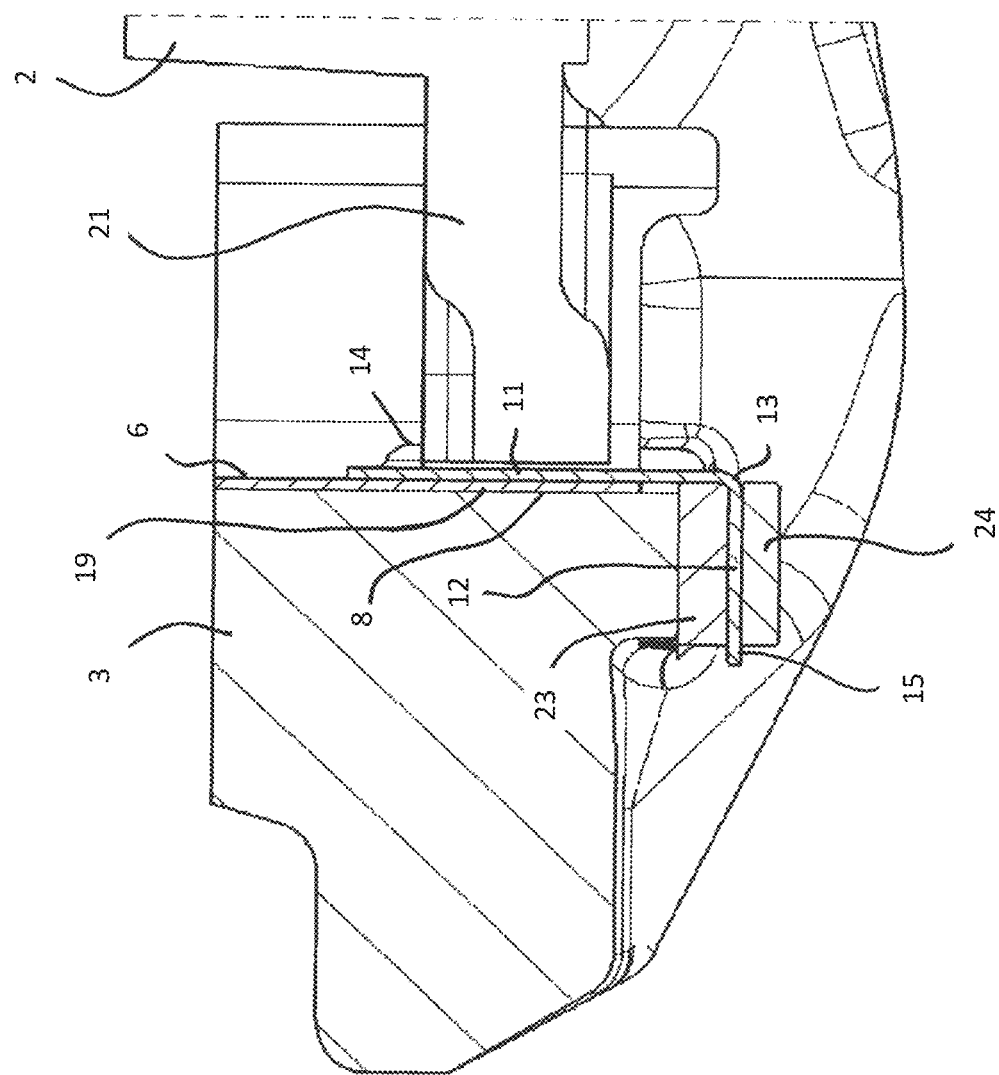
FIG. 5 shows a horizontal cross-sectional view of a part of the assembly of FIG. 1.
Figure 6:
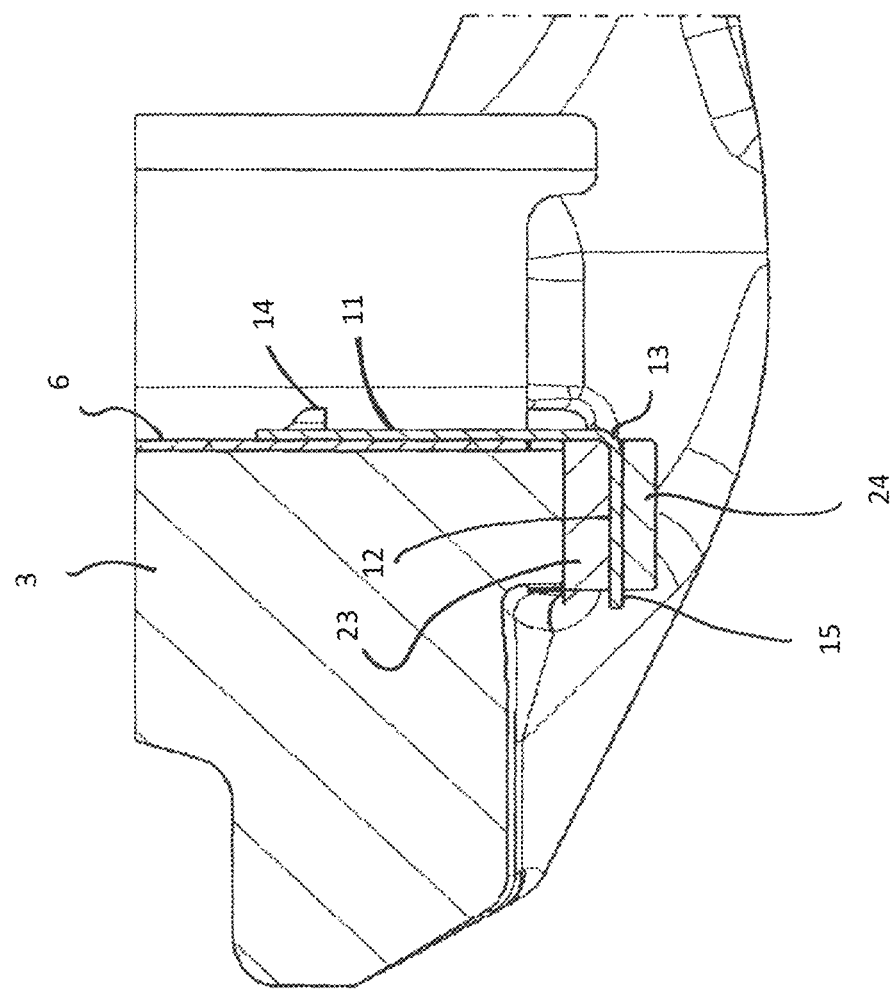
FIG. 6 shows a horizontal cross-sectional view of a part of the configuration of FIG. 4.

More detailed representations of the retraction spring 10 are shown in FIGS. 5-7. The retraction spring 10 has a spring body 17 with a first portion 11, a second portion 12 and an intermediate portion 13. The intermediate portion 13 connects the first and second portions 11, 12.

The first portion 11 comprises a contact portion 14 for contacting the brake pad 2. For instance, the contact portion 14 may include a protrusion or a tab that abuts the brake pad 2. The contact portion 14 could also be fixed to the brake pad 2, preferably to the pad ear, for instance by a riveting or some other method, to fix the retraction spring 10 directly to the brake pad 2. In this case, the mounting process would then be affected. More specifically, each brake pad 2 may include two opposite pad ears 21 extending laterally that abut the contact portion 14 of the retraction spring 10. Furthermore, each retainer 6 includes an elastic end portion 26 for vertically supporting the brake pad 2. More specifically, each pad ear 21 is secured between end portion 26 and projection 20.

The second portion 12 of the retraction spring 10 is connected to the calliper support bracket 3. The second portion 12 may include two legs 15 and a slot 16 extending between the legs 15. The legs 15 can be slidably attached to an engagement feature 9 of the calliper support bracket 3. The legs 15 extend parallel to one other.

The first and second portions 11, 12 generally have a planar shape. The intermediate portion 13 has a curved shape and is bent around an edge 22 of the engagement feature 9. The first and second portions 11, 12 are arranged at an angle to each other. For example, the angle between the first and second portions 11, 12 is between 70° and 110°, such as between 80° and 100°. In the present embodiment, the angle between the first and second portions 11, 12 is 90°. The first portion 11 extends in the axial direction, while the second portion 12 extends in a lateral direction. In the present disclosure, the axial direction is defined by the axial movement of the brake pads 2 towards the brake disc during a brake action. The lateral direction may be perpendicular to the axial direction. The axial direction and the lateral direction may both lie in a horizontal plane.

In some instances, the retraction spring 10 comprises a plate and two leg portions. Each leg portion may comprise an axial leg portion extending axially and connected to the plate, a knee portion 13 and a lateral leg portion 12 extending laterally. The axial leg portion and the lateral leg portion 12 may be arranged at an angle relative to one other. The lateral leg portion 12 can be connected to the attachment feature 9 of the calliper support bracket 3 and the knee portion 13 may have a bended/curved shape. The first portion 11 mentioned above may include said axial leg portion and said plate.

The material of the first portion 11 axially extending between the contact portion 14 and the intermediate portion 13 is configured to be stretched in the axial direction (axially deformed) upon a brake action and to return to its unstretched state upon a brake release. In typical configurations, the first portion 11 is stretched at most 0.5 mm, for instance at most 0.2 mm. Further, a straight line segment extending axially from the contact portion 14 to the intermediate portion 13 lies completely within the material of the first portion 11 both in the loaded and the non-loaded condition of the retraction spring 10.

The engagement feature 9 includes an edge 22 around which the intermediate portion 13 is arranged or bent. Moreover, the engagement feature 9 of the calliper support bracket 3 engages with the second portion 12 of the retraction spring 10. More specifically, the engagement feature 9 can comprise a protrusion 23, which can extend in the axial direction. The protrusion 23 defines an abutment surface extending laterally for contacting the second portion 12. The engagement feature 9 and/or the protrusion 23 can be a separate part (cf. FIG. 6) that is secured to the calliper support bracket 3, e.g. by mechanical fasteners such as screws. However, the engagement feature and/or the protrusion 23 can also be integrally formed with the calliper support bracket 3. The engagement feature 9 can further comprise a fixation element 24 that can be secured to the protrusion 23. The second portion can be located between the protrusion 23 and the fixation element 24. The fixation element can be a T-shaped element 24 which can be fixed to the protrusion 23, for example by using a fastener 25 such as a bolt or a screw. The legs 15 of the second portion 12 can be sandwiched between the T-shaped element 24 and the protrusion 23 of the engagement feature 9. Stated otherwise, the fixation element 24 engages with the slot 16 extending between the legs of the second portion 12.

In the following, the mode of operation of the retraction spring 10 is elucidated. When a braking action is initiated, the brake pads 2 are moved towards the brake disc. As a result, the retraction spring 10, i.e. the first portion 11, is stretched in the axial direction. More specifically, the material of the spring 10 extending between the contact portion 14 and the intermediate portion 13 is stretched, e.g. the material of the plate and the axial leg portion, and the spring 10 is axially deformed. After the braking action has been performed, the brake pads 2 move away from the brake disc. The retraction spring 10 assists in retracting the brake pad 2 away from the brake disc by providing a spring force in axial direction that forces the brake pads 2 back to their initial position.

Thus, by virtue of the retraction spring 10, rubbing contact between the brake pad 2 and the rotating brake disc (residual brake drag) can be reduced or even eliminated in non-braking conditions (i.e. when the brake is released and/or not applied). As the material of the first portion 11 is stretched the retraction spring 10 has a comparatively high spring stiffness of at least 250 N/mm. In some instances, the spring stiffness is at least 500 N/mm. The spring stiffness depends on Young's modulus of elasticity and the dimensions of the retraction spring. Suitable materials for the retraction spring 10 include various metals, steel, stainless steel or composite materials.

Typically, the brake pad 2 is subject to wear during the lifetime of the brake pad 2. The wear of the brake pad 2 results in a decreased axial thickness of the brake pad 2. More specifically, the friction material of the brake pad 2 wears. The retraction spring 10, however, should provide a substantially constant retraction force independently from brake pad wear. According to some embodiments, the retraction spring 10 is plastically deformed as the brake pad wears. In particular, the length of the second portion 12 may be decreased and the length of the first portion 11 may be increased.

In the following, reference is made in particular to FIGS. 7A-7C. FIG. 7A shows a first state of a part of the retraction spring 10. Here, the retraction spring 10 is shown in a state in which new brake pads 2 (not shown in FIGS. 7A-7C) are freshly installed in the brake assembly 10, i.e. the brake pads 2 have not been subject to wear yet. When the brake is applied, the brake pads 2 are moved towards the brake disc which results in a force $F_1$ pulling the retraction spring 10 between the contact portion 14 and pivot point $P_1$ located in the intermediate portion 13. Thus, the material of the retraction spring 10 extending from the contact portion 14 to the pivot point $P_1$ is stretched in the axial direction. The second portion 12 and the attachment feature 9 (or more specifically, the fixation element 24) are configured such that the second portion 12 is firmly held by the attachment feature 9 if the force $F_1$ is lower than a predetermined value. Thus, the length and shape of the second portion 12 are not affected by the braking action.

As indicated above, the second portion 12 can be configured to be movably attached to the calliper support bracket 3. In particular, the second portion 12 may be configured to slide relatively to the calliper support bracket 3 when a force $F_2$ pulling the first portion exceeds a predetermined value. This is, for example, the case when wear occurs. If wear occurs, the brake pad typically gets closer to the brake disc. This is reflected by a higher retraction spring stretch, which, if properly designed, would cause a proportional deformation of the retraction spring in the edge area. In this case, the legs 15 may slide relative to the engagement feature 9. This particular case is indicated in FIG. 7B. Whether the second portion 12 moves or not can be determined by various factors such as the shape of the edge 22, the fixation element 24, the shape and thickness of the first portion 11 and/or the second portion 12, the angle between the first and second portions 11, 12. In general, there should be some clearance between the second portion 12 and the fixation element 24 so that the second portion 12, particularly the legs 15, can move when necessary.

As the brake pads 2 wear, the distance between the brake pads 2 and a fixed point on the calliper support bracket 3, such as the edge 22, increases. Thus, a force $F_2$ axially pulling the retraction spring 10 may be greater than the force $F_1$. When the force $F_2$ exceeds a predetermined value, the second portion 12 slightly moves with respect to the engagement feature 9 of the calliper support bracket 3, which is indicated by the arrows in FIG. 7B.

As a result, a lateral length of the second portion 12 and an axial length of the first portion 11 change concurrently such that the lateral length of the second portion 12 is decreased and the axial length of the first portion 11 is increased in the non-loaded condition of the retraction spring 10. The new situation is illustrated in FIG. 7C. Here, the net increase in length of the first portion 11 can be equal to the net decrease in length of the second portion 12. The increase in length of the first portion 11 compensates the wear of the brake pad 2. In this way, the retraction force provided by the retraction spring 10 can be held substantially constant independently of the brake pad wear. However, due to the increase in length of the first portion 11, the stiffness of the first portion 11 may be somewhat reduced. In particular, the increase in length of the first portion 11 corresponds to the decrease of thickness of the brake pad 2. As can be seen in FIG. 7C, the pivot point $P_1$ is moved towards the brake disc. A subsequent brake action results in stretching the material between the new pivot point $P_2$ and the contact portion 14.

It is clear for a skilled person that any features shown in the FIGS. 1-6 and 7A-7C may be combined with each other or may be separately claimed as long as they do not contradict each other.

LIST OF REFERENCE NUMERALS 1 brake assembly
2 brake pad
3 calliper support bracket
4 gap
5 pad clip
6 retainer
7 connecting portion
8 abutment surface
9 engagement feature
10 retraction spring
11 first portion
12 second portion
13 intermediate portion
14 contact portion
15 leg
16 slot
17 spring body
18 projection segment
19 abutment segment
20 projection
21 pad ear
22 edge
23 protrusion
24 T-shaped element
25 fastener
26 elastic end portion

The invention claimed is:
1. A retraction spring for retracting a brake pad in an axial direction upon a brake release,
the retraction spring having a spring body with a first portion, a second portion, and an intermediate portion connecting the first and second portions such that a lateral length of the second portion of the retraction spring is configured to be changeable in relation to an axial length of the first portion of the retraction spring, wherein:
the first portion comprising a contact portion for contacting the brake pad,
the second portion connected to a caliper support bracket,
the first portion axially extending between the contact portion and the intermediate portion is configured to be stretched in the axial direction upon a brake action and to return to an unstretched state upon a brake release, and
wherein the second portion includes a slot for engaging with an engagement feature on the caliper support bracket.

2. The retraction spring according to claim 1, wherein the first and second portions are arranged at an angle to each other, wherein the angle between the first and second portions is preferably between 70° and 110°.

3. The retraction spring according to claim 1, wherein the second portion is configured to be slidably attached to the caliper support bracket.

4. The retraction spring according to claim 1, wherein the retraction spring is configured such that, when a force pulling the first portion during the brake action exceeds a predetermined limit, an axial length of the first portion is irreversibly increased and a length of the second portion is irreversibly decreased.

5. The retraction spring according to claim 1, wherein the first portion is reversibly stretchable at most 0.5 mm when a maximal brake force is applied.

6. The retraction spring according to claim 1, wherein a spring stiffness of the retraction spring is at least 250 N/mm.

7. The retraction spring according to claim 1, wherein the first portion has a planar shape and/or the second portion has a planar shape and/or the intermediate portion has a curved shape.

8. A brake assembly, comprising the retraction spring of claim 1 and the caliper support bracket for supporting a caliper of a disc brake, the caliper support bracket including
an engagement feature for securing to the second portion of the retraction spring.

9. The brake assembly according to claim 8, wherein the engagement feature includes an axial protrusion and a fixation element fixed to the axial protrusion.

10. The brake assembly according to claim 8, further including a pad clip comprising at least one retainer for supporting the brake pad, wherein the caliper support bracket includes an abutment surface for abutting the at least one retainer of the pad clip.

11. A retraction spring for retracting a brake pad in an axial direction upon a brake release,
the retraction spring having a spring body with a first portion, a second portion, and an intermediate portion connecting the first and second portions,
wherein:
the first portion comprising a contact portion for contacting the brake pad,
the second portion connected to a caliper support bracket,
the first portion axially extending between the contact portion and the intermediate portion is configured to be stretched in the axial direction upon a brake action and to return to an unstretched state upon a brake release, and
the retraction spring is configured such that, when a force pulling the first portion during the brake action exceeds a predetermined limit, an axial length of the first portion is irreversibly increased and a length of the second portion is irreversibly decreased.

12. The retraction spring according to claim 11, wherein the first and second portions are arranged at an angle to each other, wherein the angle between the first and second portions is preferably between 70° and 110°.

13. The retraction spring according to claim 11, wherein the second portion is configured to be slidably attached to the caliper support bracket.

14. The retraction spring according to claim 11, wherein the first portion is reversibly stretchable at most 0.5 mm when a maximal brake force is applied.

15. The retraction spring according to claim 11, wherein a spring stiffness of the retraction spring is at least 250 N/mm.

16. The retraction spring according to claim 11, wherein the first portion has a planar shape and/or the second portion has a planar shape and/or the intermediate portion has a curved shape.

17. The retraction spring according to claim 11, wherein the second portion includes a slot for engaging with an engagement feature on the caliper support bracket.

18. A brake assembly, comprising the retraction spring of claim 11 and the caliper support bracket for supporting a caliper of a disc brake, the caliper support bracket including
an engagement feature for securing to the second portion of the retraction spring.

19. The brake assembly according to claim 18, wherein the engagement feature includes an axial protrusion and a fixation element fixed to the axial protrusion.

* * * * *